(12) United States Patent
Jacobson et al.

(10) Patent No.: US 7,197,897 B2
(45) Date of Patent: Apr. 3, 2007

(54) CHEMICAL STRENGTHENING PROCESS FOR DISKS USED IN DISK DRIVE DATA STORAGE DEVICES

(75) Inventors: Nathan Ellis Jacobson, Rochester, MN (US); Terry Lee Jensen, Rochester, MN (US); Rick Allan Sprague, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 254 days.

(21) Appl. No.: 10/116,340

(22) Filed: Apr. 4, 2002

(65) Prior Publication Data
US 2003/0188552 A1    Oct. 9, 2003

(51) Int. Cl.
*C03C 15/00*    (2006.01)

(52) U.S. Cl. .................. 65/30.14; 65/30.1; 427/431; 427/430.1

(58) Field of Classification Search .............. 65/30.1, 65/30.14; 427/430.1, 431, 127
See application file for complete search history.

(56) References Cited

U.S. PATENT DOCUMENTS 3,879,274 A * 4/1975 Matsumori et al. ......... 205/769
6,119,483 A * 9/2000 Takahashi et al. .......... 65/30.14
6,534,120 B1 * 3/2003 Ozawa et al. ............... 427/127

FOREIGN PATENT DOCUMENTS

JP    61-178004    *    8/1996

* cited by examiner

Primary Examiner—Dionne W. Mayes
(74) Attorney, Agent, or Firm—Bracewell & Giuliani LLP

(57) ABSTRACT

A salt mixture used for chemical strengthening of data recording disks is subjected to sub-micron filtration prior to use to remove certain impurities. Preferably, glass disks are chemically strengthened by ion exchange in a bath of molten sodium nitrate and potassium nitrate. A salt fresh mixture is prepared by starting with high-grade bulk salt in the intended proportions, melting the salt, and filtering the salt in a stainless steel filter, which is preferably approximately 2 micron or smaller. Filtration removes trace amounts of certain contaminants. The salt mixture thus prepared is then used for chemical strengthening of disks in the conventional manner.

18 Claims, 5 Drawing Sheets

CHEMICAL STRENGTHENING PROCESS FOR DISKS USED IN DISK DRIVE DATA STORAGE DEVICES

FIELD OF THE INVENTION

The present invention relates to disk drive data storage devices, and in particular, to the manufacture of chemically strengthened disks for use in disk drive data storage devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains one or more disks attached to a common rotating hub or spindle. Each disk is a thin, flat member having a central aperture for the spindle. Data is recorded on the flat surfaces of the disk, usually on both sides. A transducing head is positioned adjacent the surface of the spinning disk to read and write data. Increased density of data written on the disk surface requires that the transducer be positioned very close to the surface. Ideally, the disk surface is both very flat and very smooth. Any surface roughness or "waviness" (deviation in the surface profile from an ideal plane) decrease the ability of the transducing heads to maintain an ideal distance from the recording media, and consequently decrease the density at which data can be stored on the disk.

The disk is manufactured of a non-magnetic base (substrate), which is coated with a magnetic coating for recording data on the recording surfaces, and which may contain additional layers as well, such as a protective outer coating. Historically, aluminum has been the material of choice for the substrate. As design specifications have become more demanding, it is increasingly difficult to meet them using aluminum, and in recent years there has been considerable interest in other materials, specifically glass. Glass or ceramic materials are potentially superior to aluminum in several respects, and offer the potential to meet higher design specifications of the future.

One of the major drawbacks to the use of glass or ceramic disk substrates is the cost of their manufacture. Glass is currently used in some commercial disk drive designs, although generally at a higher cost than conventional aluminum. In a typical glass disk manufacturing process, the glass base material is initially formed in thin glass sheets. Multiple glass disks are then cut from a sheet. The circumferential edges are finished, which typically requires multiple process steps. The broad, flat data recording surfaces are then lapped to reduce waviness, and polished to a smooth finish, which again may require multiple process steps. The glass substrate is then subjected to a chemical strengthening process, in which the disks are immersed in a salt bath and an ion exchange takes place between ions in the glass and ions in the salt. The glass substrate thus formed and strengthened is then coated with a magnetic recording layer, and may be coated with other layers such as a protective layer. Additionally, there are typically multiple intermediate cleaning steps for cleaning off process residues.

Related to process cost is the disk yield from the manufacturing process. Disk requirements have very demanding tolerances, and many of the processes have the capability to introduce defects into the disks. Glass disk manufacture being a relatively new field in comparison to manufacture of older aluminum-based disks, yields from glass disk manufacturing processes are often not as good as is typical of older, more established processes. Continued yield increases require continued improvements to the various manufacturing process steps to which a glass disk is subjected.

Finally, related to both cost and yield is the issue of overall disk quality. Some disks, although passing manufacturing inspections or meeting minimum specifications, nevertheless fail in the field or otherwise do not perform as well as expected due to quality defects that were not anticipated by those who designed the manufacturing inspection procedures or generated the disk specification requirements.

An understanding of the effect of individual manufacturing process steps on overall cost, yield and quality can lead to improved manufacturing approaches. Often, it is this understanding, not obvious in itself, which suggests a process improvement. In some cases, the process improvement is relatively simple, given the understanding of the cause of a recurrent process deficiency.

Unless the cost, yield, and quality of glass disk manufacturing processes can be substantially improved, it will be difficult to replace aluminum with glass and realize the potential benefits that glass disks offer.

SUMMARY OF THE INVENTION

In accordance with one or more aspects of the present invention, a salt mixture used for chemical strengthening of data recording disks is subjected to filtration in the near micron range prior to use to remove certain impurities.

In the preferred embodiment, a salt mixture comprising molten sodium nitrate and potassium nitrate is used for a chemical strengthening ion exchange bath for glass disks. The salt mixture is periodically replaced when the donor ions become sufficiently depleted. A fresh mixture is prepared by starting with high-grade bulk salt in the intended proportions, melting the salt, and filtering the salt in a stainless steel filter, which is preferably approximately 2 micron or smaller. Filtration removes trace amounts of silica, clay, iron oxide, and other contaminants. The salt mixture thus prepared is then used for chemical strengthening of disks in the conventional manner. The salt mixture is optionally filtered periodically or continuously thereafter.

It has been observed that silica has an affinity for glass disks, and even trace amounts of silica in the salt mixture tend to accumulate on the disk surfaces, particularly after the salt mixture has been replaced. This has the effect of depressing process yields, and therefore increasing total manufacturing costs. Additionally, some contaminants from the salt mixture may accumulate on the disk surface without necessarily causing the disk to fail inspection, although such contaminants tend to reduce the overall quality of the disks shipped, and may in some instances cause failures in the field.

By pre-filtering the salt mixture in accordance with the preferred embodiment of the present invention, substantial reduction in contamination from the chemical strengthening process can be achieved, resulting in higher yields and improved disk quality.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview of Disk Drive Design

Figure 1:
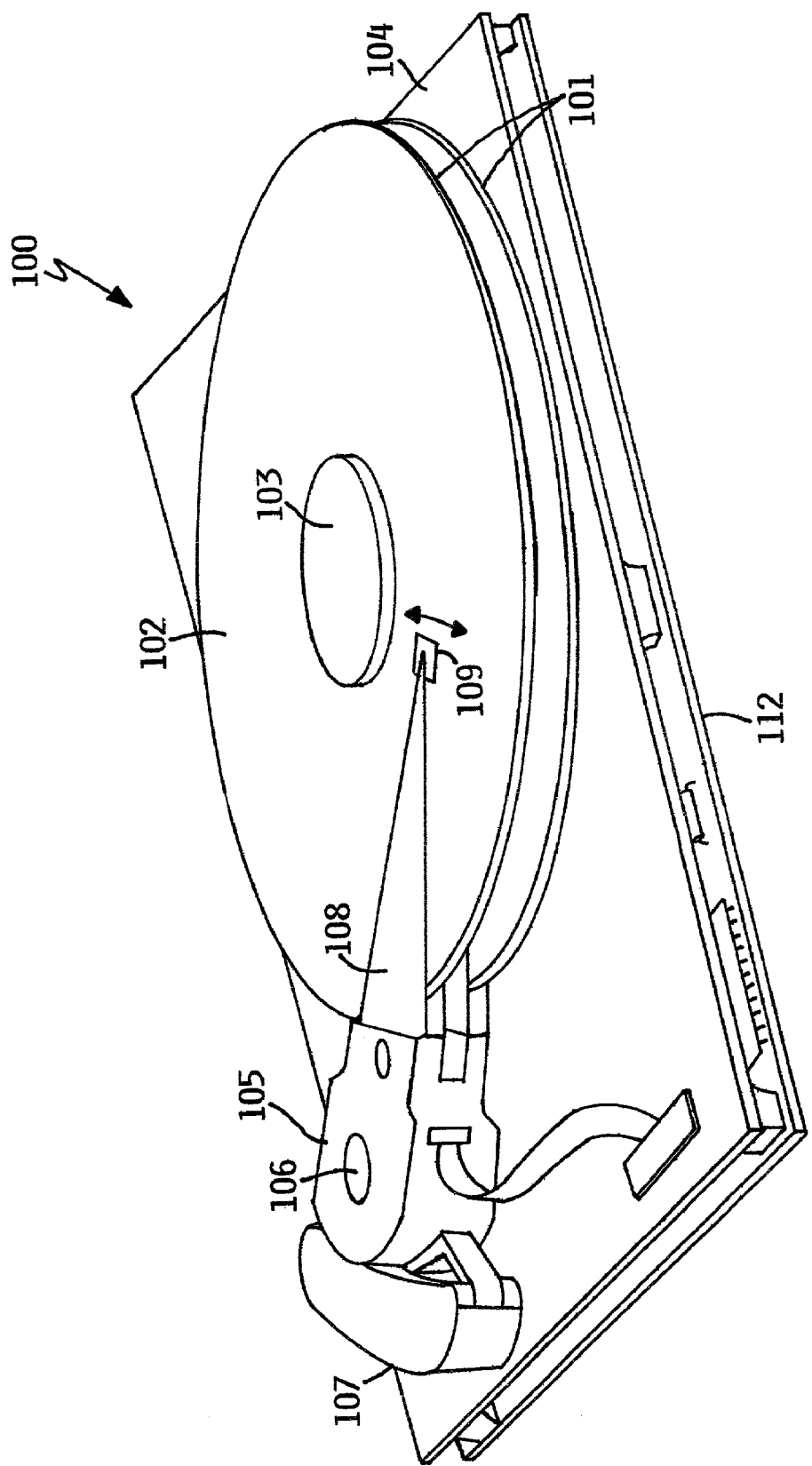
FIG. 1 is a simplified representation of a rotating magnetic disk drive storage device, in which disks as described herein are installed for use, according to the preferred embodiment of the present invention.

Referring to the Drawing, wherein like numbers denote like parts throughout the several views, FIG. 1 is a simplified drawing of the major components of a rotating magnetic disk drive storage device 100, in which disks as described herein are installed for use. Disk drive 100 typically contains one or more smooth, flat disks 101 which are permanently attached to a common spindle or hub 103 mounted to a base 104. Where more than one disk is used, the, disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk 101 is formed of a solid disk-shaped base or substrate, having a hole in the center for the spindle. In the past, the substrate has typically been aluminum, but other materials are possible. In accordance with the preferred embodiment of the present invention, glass is used as the disk substrate material, although other materials may possibly be subjected to chemical strengthening in accordance with the present invention. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator 105 positions a transducer head 109 adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding a shaft or bearing 106 having comb-like arms extending toward the disk (which is, for this reason, sometimes referred to as the "comb"); a set of thin suspensions 108 attached to the arms, and an electromagnetic motor 107 on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head 109 is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer, and therefore a smooth and even disk surface is required. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Various electrical components control the operation of disk drive 100, and are depicted mounted on circuit card 112 in FIG. 1, although they may be mounted on more than one circuit card, and the card or cards may be mounted differently.

It will be understood that FIG. 1 is intended as a simplified representation of a rotating magnetic disk drive, which is merely an example of a suitable environment for using a glass or ceramic disk substrate produced in accordance with the preferred embodiment. It does not necessarily represent the sole environment suitable for such a disk.

DETAILED DESCRIPTION

In accordance with the preferred embodiment of the present invention, a glass recording disk substrate suitable for use, e.g., in a rotating magnetic disk drive data storage device, undergoes a chemical strengthening process during manufacture, in which a salt mixture used for chemical strengthening is subjected to filtration in the near micron range to remove certain impurities. The process of producing a disk substrate is described herein with respect to glass disk substrates, which at present is the material of choice. However, it is possible that at least some other materials, such as glass ceramic materials which have some glass content, are also potentially suitable for use as substrates in disk drive storage devices, and would benefit from a chemical strengthening process in accordance with the present invention. Certain ceramic or glass ceramic materials have properties which are potentially superior to glass, e.g., higher strength or higher temperature stability. The high cost of manufacture currently discourages use of such materials, but it is foreseeable that such materials may become employed in disk drives in the future, particularly if processes for reducing the cost of manufacture can be found. Therefore, unless explicitly so stated, the description and claims herein should not be taken as limited to any particular material or glass composition.

Figure 2:
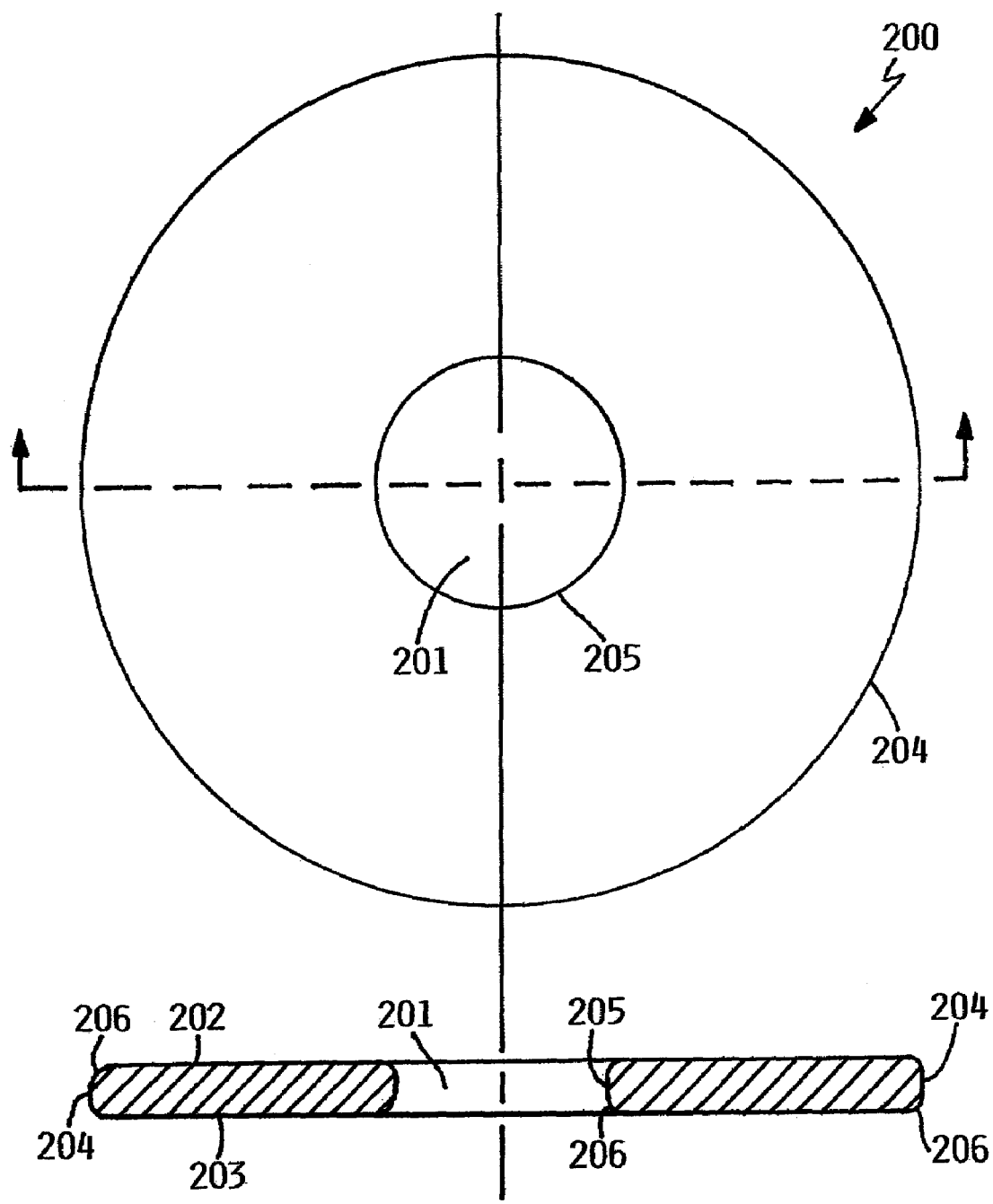
FIG. 2 illustrates a finished disk substrate in accordance with the preferred embodiment, shown in both a top view and a sectional view.

FIG. 2 illustrates a finished disk substrate 200 produced in accordance with the preferred embodiment, shown in both a top view and a sectional view in the plane of the disk axis. The thickness of the disk substrate in proportion to its diameter is exaggerated in the sectional view for illustrative purposes. For example, for a typical disk having an outer diameter of 95 mm and an inner diameter of 25 mm, the glass substrate should have a nominal thickness of approximately 1.05 mm, it being understood that these dimensions are merely by way of example, and the present invention is not limited to any particular size disk. As shown, the disk is a flat, circular member having a circular central hole 201. The broad, flat surfaces 202, 203 are used for recording data; typically, both sides of the disk are used, although it is possible to use only one side. The periphery of the disk forms an outer circumferential edge 204. The central hole forms an inner circumferential edge 205. The edge junctures 206 (where the outer circumferential edge 204 meets the broad, flat surfaces 202, 203, and where the inner circumferential edge 205 meets the broad flat surfaces 202, 203) are typically chamfered to reduce internal stresses at these points, but may also be formed as radii or some other cornering shape, or need not be cornered at all (i.e., may be sharp corners).

Although it is a solid material of a simple geometrical shape, disk substrate 200 is in fact a precision machine part which is manufactured to exacting tolerances and specifications. Disk 200 is typically made thin in order to reduce the size of the disk drive recording device or to fit as many recording disks as possible in an available pre-determined form factor to increase recording capacity. Such a thin disk has a tendency to warp as a result of various steps of formation. This warp must be carefully limited, or undue oscillations may result at operating speed. Sufficient material strength must be maintained in the presence of stresses during operation and as a result of unintended but foreseeable misuse, such as occasional mechanical shock. The surface of the disk must be precision polished to a very low roughness so that the head can fly above the disk at appropriately small distances. Finally, the disk substrate must be very clean, for even small amounts of contaminant can interfere with proper operation.

Figure 3:
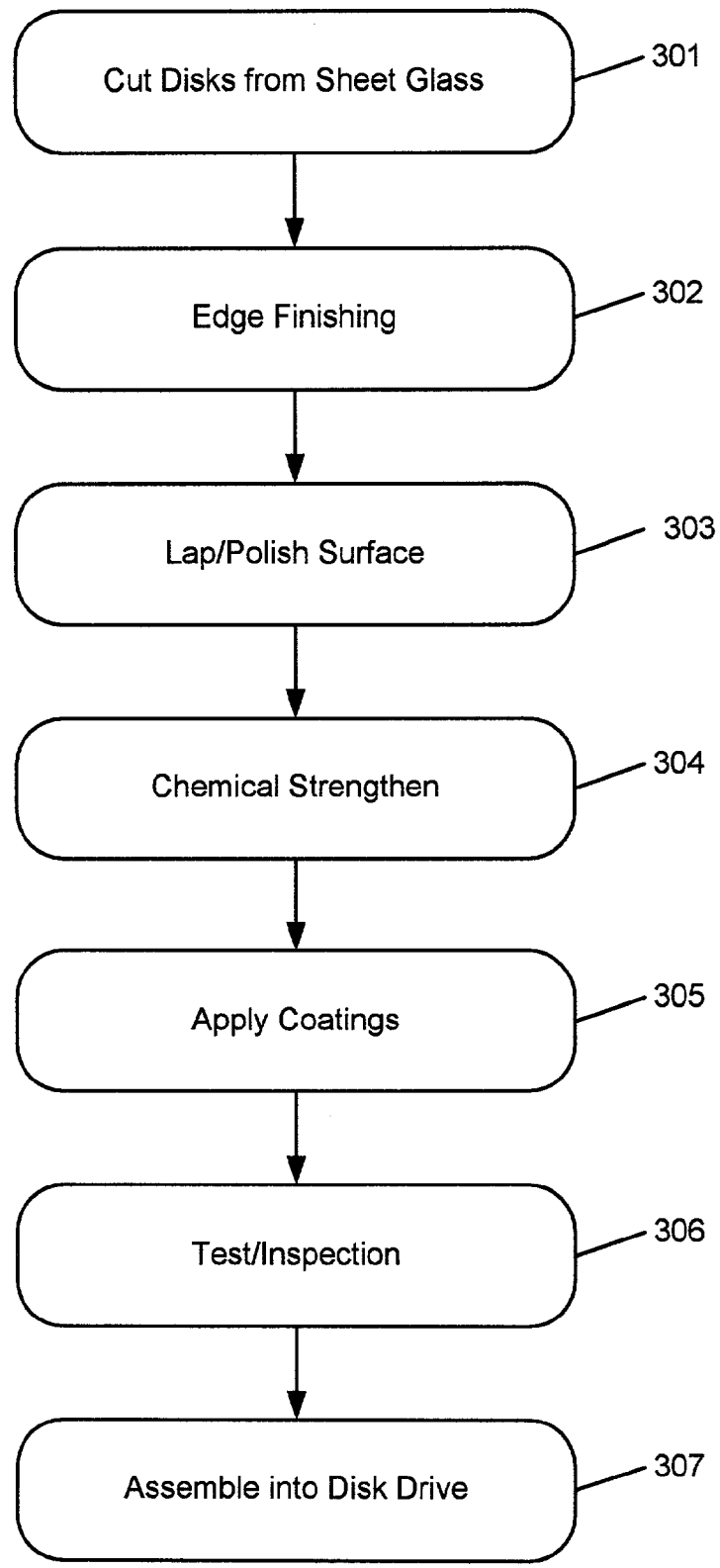
FIG. 3 is a high-level process flow diagram showing the disk manufacturing process, according to the preferred embodiment.

FIG. 3 is a high-level process flow diagram showing the disk manufacturing process for a glass disk, according to the preferred embodiment. An unpolished, unfinished glass disk blank is first formed by rolling thin glass sheets, much larger than a single disk, and by cutting the individual disks from the thin glass sheets (step 301). Central disk aperture 201 is cut in the disks at the same time that disks are cut from the sheets. Cutting is generally accomplished by scoring and breaking, although other techniques are possible.

The initial cutting step produces very rough cylindrical edges 204, 205. Although data is not stored on these edges, it is important that they be finished. The rough edge produced by cutting will have fractures near the surface. Once the disk is installed in a disk drive recording device, it will be spun at high speed. Since glass is a brittle material, fractures in this rough surface could propagate during operation or as a result of external shock. This might cause pieces of glass to break off the disk, which could lead to disk drive failure. The purpose of edge finishing is therefore primarily to increase the mechanical strength of the disk by smoothing the edges and reducing internal stresses. Edge finishing (step 302) generally involves one or more grinding operations which chamfer (or otherwise corner) the edge and provide a smoother surface. Edge finishing may involve a polishing step, although in general it is not necessary to polish the edges to the same degree of smoothness as the data recording surfaces.

After edge finishing, the data recording surfaces 203, 203 are lapped and polished (step 303). Typically, the finishing of the recording surfaces is performed in multiple steps. Lapping, which is a form of rough polishing, is performed to remove sufficient material to bring the disk near thickness specifications and to remove or reduce waviness in the disk surface. Lapping may leave a thin fracture layer near the disk surface, i.e., a thin layer of material having very fine fractures resulting from the lapping process. The disk is typically subjected to one or more polish steps to remove this fracture layer and to provide a very flat, very smooth data recording surface.

Techniques for forming and cutting the disk blank, finishing the edges, and finishing the flat surfaces, as well as certain other aspects of the manufacture of a glass disk substrate, are known in the art. Any suitable process steps, now known or hereafter developed, may be used to manufacture the unfinished disk substrate prior to chemical strengthening as herein described.

The disk is then chemically strengthened by immersion in a salt bath, represented generally as step 304, and described in greater detail with respect to FIGS. 4 and 5 below.

After chemical strengthening, the disk substrate is substantially complete. The next phase of disk manufacture is the application of one or more coatings to the substrate (step 305). Since the substrate is a non-magnetic material, a thin layer of a magnetizable material is applied to the substrate. In the finished disk drive, encoded data will be magnetically recorded in the magnetizable layer. This magnetizable layer is usually applied by sputtering in a vacuum. Additional layers, such as a protective overcoat or a lubricant layer, may optionally be applied.

After all necessary coatings have been applied to the substrate, the disk is subjected to final test and inspection (step 306). Preferably, this involves a dynamic "glide test" in which a head is flown over the disk surface to detect surface asperities. Other tests may be performed as well.

If the disk passes final test and inspection, it proceeds to an assembly phase in which it is assembled into a disk drive data storage device (step 307). Assembly of the disk drive device may involve multiple steps and tests or inspections as are known in the art, and which are represented only generally be step 307.

FIG. 3 is intended as a very high-level representation of the disk manufacturing process. As explained above, some of the steps represented in FIG. 3 are in fact multiple process steps. Additionally, the disk is typically cleaned at various stages of manufacture to remove process residues. For example, the disk may be cleaned after each polishing operation (which may mean multiple cleanings) to remove abrasive polishing slurry residue from the disk surface. The disk is typically cleaned after chemical strengthening to remove salt residues. There may be other process steps which are not shown in FIG. 3. For example, some (although not all) disk designs require texturing of all or a portion of the disk surface. Texturing, if performed, is typically performed after polishing and strengthening, but before coatings are applied. It should further be understood that FIG. 3 represents a typical order of process operations, and that the order of certain operations may vary. For example, it would be possible to finish the edges after polishing the broad surfaces, or it would be possible to interleave some of the multiple edge finishing steps with other steps involving the finishing of the broad surfaces. Furthermore, it will be appreciated that advancements in the art may result in changes in the order of certain processes, the processes themselves, or in the addition of new process steps.

In accordance with the preferred embodiment of the present invention, the disk substrate is subjected to chemical strengthening. The initial cutting of a glass disk (step 301) is a fairly rough operation. Conventional glass grinding (step 302) is a process which chips and tears away small pieces of the material under the influence of an abrasive (typically diamond). This chipping or tearing action leaves surface roughness and causes subsurface damage in the form of brittle fractures. Even where the surface is subsequently polished to a visibly mirror finish using a cerium oxide polishing agent, some of the subsurface damage remains. Typically, subsurface damage is of concern at the disk edges, which are finished by cutting and grinding, rather than on the broad surfaces, where somewhat more delicate lapping and polishing techniques are employed to produce a smoother surface, although a small amount of subsurface damage may be present on the broad surfaces as well.

Because a disk is relatively thin, external shock or even the high speed of normal operation impose substantial stresses on the material. Small cracks and surface irregularities can readily spread in brittle materials such as glass, substantially reducing the strength of the finished part. Ultimately, such cracks can cause pieces of the disk to break off from the edges, which may result in catastrophic failure of the disk drive storage device.

The break strength of the finished disk can be substantially increased if the tendency of these small subsurface cracks to propagate can be arrested. Chemical strengthening of the glass operates on this principle. Initially, a chemically strengthenable material is used to form the disk. A chemically strengthenable material is one which is doped with relatively small ion impurities. Lithium (Li) is the preferred dopant, although sodium (Na) is sometimes used. In chemical strengthening, the glass disk substrate is subjected to an ion exchange process, in which the dopant ions are exchanged for larger ions (such as sodium or potassium (K)) under catalytic conditions. Specifically, the glass disks are immersed in a bath of molten salt containing the larger ions, and allowed to remain sufficiently long for ion exchange to take place. The larger ions create internal compressive stresses in the glass substrate, which increase its strength. In particular, the strength of the glass is increased because the internal compressive stresses added by the larger ions tend to retard the growth of cracks within the glass when subjected to external forces.

The inventors herein have observed that certain surface contamination present on finished disks or disk substrates can be traced to impurities in the salt used for ion exchange in the chemical strengthening process step, and have determined that by filtering the salt bath mixture prior to chemical strengthening the disks, a significant reduction in surface contamination can be achieved, resulting in improved yields and quality from the manufacturing process.

In the preferred embodiment, the salt used for ion exchange is a mixture sodium nitrate ($NaNO_3$) and potassium nitrate ($KNO_3$). Initially, the salt bath is prepared by mixing 40% by weight American Chemical Society (ACS) reagent grade $NaNO_3$ and 60% by weight ACS reagent grade $KNO_3$. Reagent grade salt is the highest purity salt which is readily commercially available. However, even reagent grade has trace impurities, notably silica, clay, and iron oxides. The concentration of these impurities is far too small to interfere with the desired chemical reaction, i.e., the ion exchange required for chemical strengthening. However, impurities can attach to the disk surface. Silica in particular has an affinity for glass surfaces, and therefore even trace amounts of silica in the salt mixture will attach to the surfaces of the disks. The salt, being water soluble, is typically rinsed from the disk surface with clean, de-ionized water after chemical strengthening, but silica and other impurities are not readily cleaned by such means, and remain on the disk surface. For these reasons, filtration of the salt mixture is performed.

Figure 4:
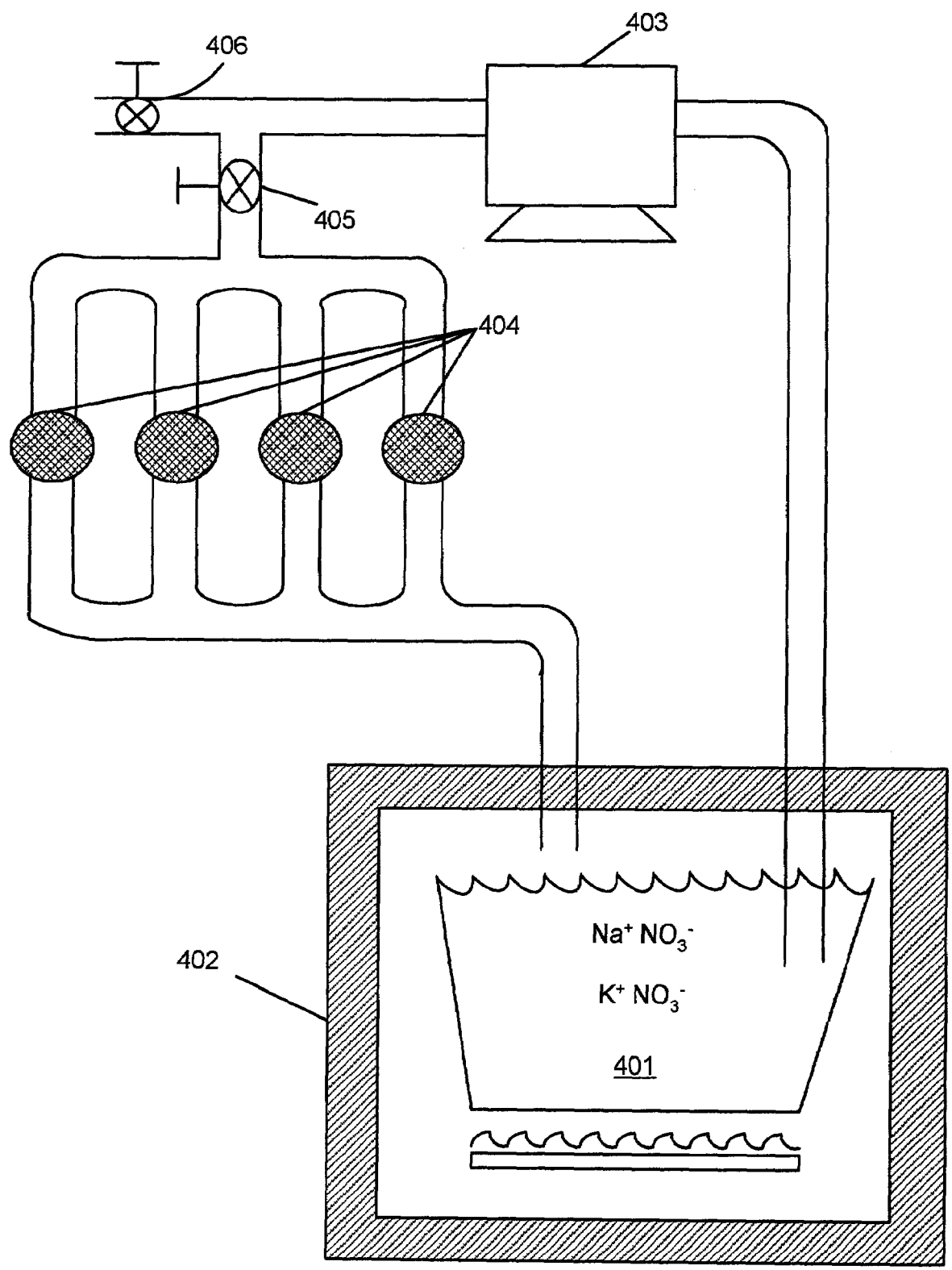
FIG. 4 is a simplified representation of a chemical strengthening salt bath apparatus for providing a chemical strengthening process step for disk substrates, in accordance with the preferred embodiment.

FIG. 4 is a simplified representation of a chemical strengthening salt bath apparatus for providing a chemical strengthening process step for disk substrates, in accordance with the preferred embodiment. The salt bath apparatus comprises a salt vessel 401 within a furnace 402. A pump 403 is coupled by pipe apparatus to the salt vessel 401, whereby molten salt can be pumped from the vessel. The pipe apparatus includes a filter valve 405 for routing salt through a bank of filters 404 and returning it to vessel 401. The pipe apparatus further includes a drain valve 406 for routing the salt externally for disposal. It will be understood that FIG. 4 is intended to be a simplified representation for illustrative purposes and does not necessarily represent the actual physical appearance of the salt bath apparatus.

In the preferred embodiment, filters 404 are high temperature stainless steel filters having a filter media size in the range of 10 microns or less, and specifically, are 2 micron or less filters. Experimental filtration with a parallel bank of four 2 micron filters (Pall Co. model C6-14-30-4M020) yielded significantly improved process results. However, since some contamination was still detectable in the salt bath, it is believed that filtration using a somewhat smaller filtering media, such as a 0.5 micron filter, would be preferable. A smaller media filter such as a 0.5 micron filter could be used by itself, or could be placed in series with and downstream of a 2 micron filter, to reduce any tendency of the 0.5 micron filter to clog. These filter sizes are stated here by way of example, it being understood that various other combinations of filter types and sizes might alternatively be used. Although a single filter 404 is shown in the simplified representation of FIG. 4, it will be understood that each filter 404 might in fact be multiple filters in series, which could be different sizes. The number of filters 404 used will vary with the pump capacity and various other environmental factors; although four filters are shown in the representation of FIG. 4, the number of filters may vary, and there could be only one filter.

Figure 5:
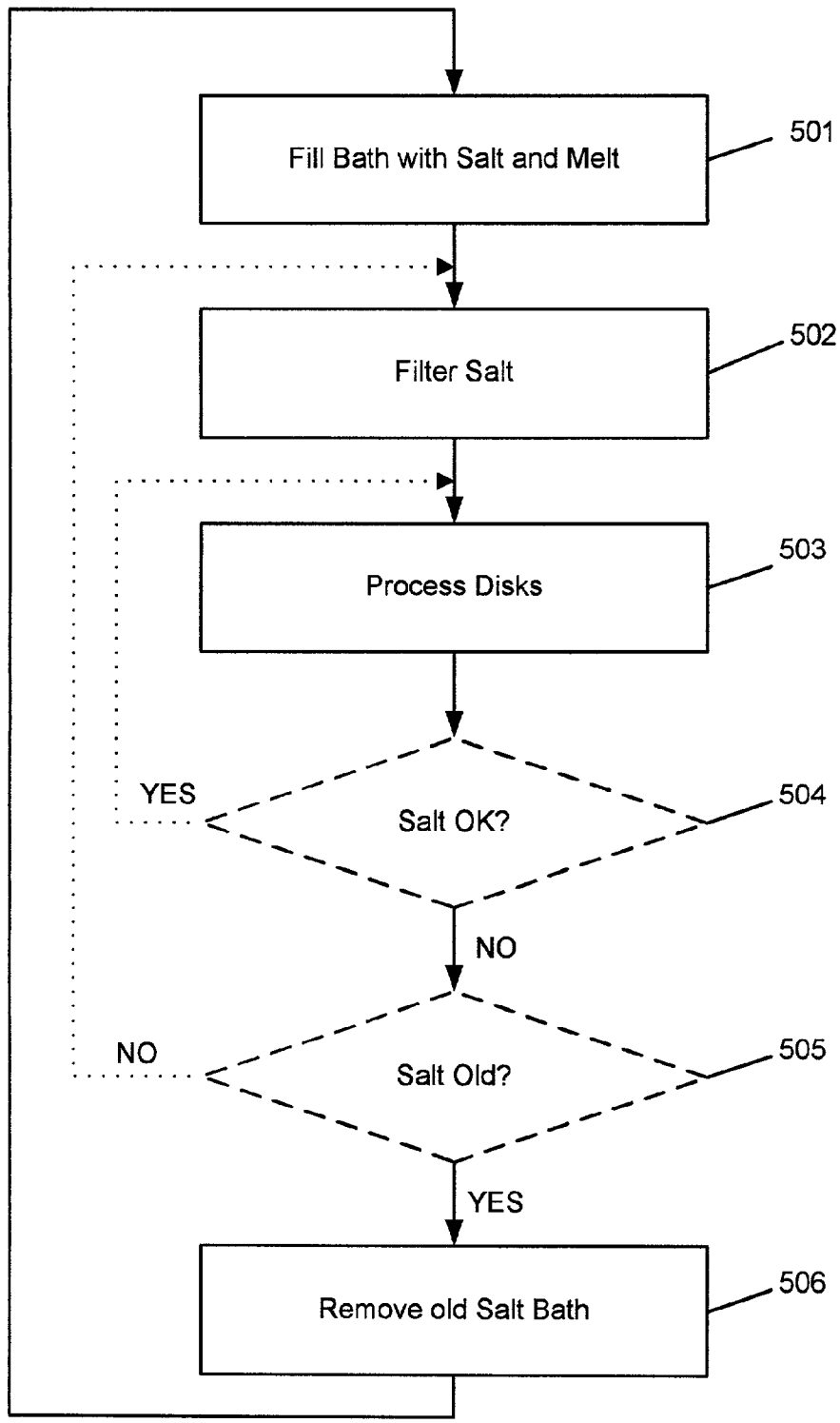
FIG. 5 is a process flow diagram showing the application of chemical strengthening to disk substrates, according to the preferred embodiment.

The operation of the salt bath apparatus of FIG. 4 in conjunction with a disk substrate chemical strengthening process is shown in the process flow diagram of FIG. 5. To begin operation, salt vessel 401 is initially filled with a fresh salt mixture of $NaNO_3$ and $KNO_3$ as specified above, and the salt is melted in furnace 402 (step 501). In the preferred embodiment, vessel 401 holds approximately 1960 gallons of molten salt, it being understood that the size may vary depending on the installation.

The salt is then filtered by closing valve 406, opening valve 405, and pumping salt through filters 404 (step 502). In the preferred embodiment, pump 403 is capable of pumping at a rate of approximately 20 gal/minute. For initial filtering of a typical salt batch, an acceptably pure salt mixture can be obtained in less than 24 hours of filtration, it being understood that this figure could vary depending on the rate of filtration, initial concentration of contaminant, desired purity, and other factors.

After the salt has been filtered, disk substrates are immersed in the salt bath for chemical strengthening (step 503). Preferably, the operating temperature of the salt bath for chemical strengthening is approximately 380° C. Approximately 12,000 disk substrates are immersed in the salt bath, and kept in the bath for several hours. The actual time of exposure varies from about 2 to about 4 hours, depending largely on the freshness of the salt mixture. I.e., a fresh salt mixture, having a higher concentration of $Na^+$ and $K^+$ ions, will undergo ion exchange with $Li^+$ in the disks more quickly.

After the initial filtration of a new batch of salt, several possible techniques exist for subsequent treatment of the salt bath. It would be possible to filter the salt only once when a new salt batch is installed, and not filter the salt thereafter (it has been observed that most of the contaminant comes from the salt, rather than from the equipment or process residues on disk substrates). It would also be possible to filter the salt intermittently after the initial filtration, e.g., after some number of batches of disks have been treated, or after detecting contamination. It would be possible to filter the salt after each batch of treated disks. Finally, it would be possible to filter the salt more or less continuously, even during the time that disks are immersed in the salt bath for chemical strengthening treatment. These various possibilities are represented by steps 504 and 505 of FIG. 5. Steps 504 and 505 are shown in dotted lines because, depending on the method used, only one or the other or both of these steps might be taken. As shown, step 504 indicates that after processing one batch of disks, the next batch may be processed directly without salt filtration. Step 505 indicates re-filtration of the salt. Where salt is re-filtered on a continuous basis, it should be understood that steps 502 and 503 can be performed concurrently. It will be understood that, although filtration performed after the initial filtering of a new batch is performed with the same equipment, the filtering time may be less than required for a new batch.

At some point, an operator will decide to discontinue use of the salt bath because the salt is "old", indicated as the "Y" branch from step 505. I.e., even though the salt may be sufficiently free of particulate contaminant, after sufficient ion exchange reactions have taken place, the smaller $Li^+$ ions begin to accumulate in the salt mixture and the $Na^+$ and $K^+$ ions become depleted. At a sufficient level of depletion, the ion exchange reaction proceeds too slowly, and a new batch of salt should be introduced. In this case, the old salt is pumped out of the vessel for disposal (step 506), and the vessel re-filled with new salt (step 501) to start the process over again.

It will be noted that the salt bath apparatus described above and represented in FIG. 4 empties filtered salt into the common salt vessel 401, where it mixes with unfiltered salt and is recirculated. Generally, where the salt is recirculated, the concentration of impurities can be expected to decline as a decaying exponential to some low limit value, the limit depending on the removal capabilities of the filters and other factors. It has been observed that several hours of filtration is sufficient to provide a salt mixture of acceptable purity. This method of recirculating the filtered salt is not necessarily as fast as using separate vessels for filtered and unfiltered salt, and filtering the salt only once. The advantages of the method of the preferred embodiment are: (a) that it is possible to implement with simpler apparatus, since only one vessel and furnace is required, and (b) it is easier to filter the salt on a continuous or intermittent basis. It would alternatively be possible to use separate vessels and filter the salt only once (or a small number of times), consistent with the present invention.

It will be understood by those skilled in the art that certain trade-offs exist among many of the process parameters described above, and that the parameters described above as part of the preferred embodiment are but one example of a set of possible parameters, which are believed to give a relatively low total process cost given currently available cost constraints. It is possible that many variations exist which could produce acceptable finished disk substrates, but which would vary the components of the total process cost.

As described earlier, a glass disk substrate produced in accordance with the preferred embodiment is suitable for use in a rotating magnetic disk drive data storage device. However, such an application is not necessarily the only application in which a glass disk substrate produced in accordance with the present invention may be used. For example, there may be other data recording techniques, now known or hereafter developed, which require a glass or other chemically strengthened disk substrate. Data may, e.g. be recorded on disk surfaces in an optically encoded form, or in some other form. In this case, there may be certain variations in disk structure from those described above, e.g., the absence of a magnetizable layer. Additionally, there may be other layers not described herein, either now known or hereafter developed, which are deposited over the glass disk substrate after manufacture of the substrate in accordance with the present invention.

Although a specific embodiment of the invention has been disclosed along with certain alternatives, it will be recognized by those skilled in the art that additional variations in form and detail may be made within the scope of the following claims:

What is claimed is:

1. A method for manufacturing a disk substrate for a rotating disk drive data storage device, comprising the steps of:

forming a disk substrate of a chemically strengthenable material to a desired shape and surface finish;

filtering a molten salt composition with a a plurality of filters, each having a filter media size of 2 microns or less, and wherein at least one filter of the plurality of filters has a filter media size of 0.5 micron or less, to remove impurities from said molten salt composition, thereby reducing a filtered molten salt composition;

delivering the filtered molten salt composition to only one vessel;

chemically strengthening said disk substrate by immersion in said filtered molten salt composition in said only one vessel; and wherein said salt composition is periodically replaced with new salt composition, and wherein each new salt composition is initially filtered prior to use.

2. The method for manufacturing a disk substrate of claim 1, wherein said molten salt composition comprises a mixture of sodium nitrate ($NaNO_3$) and potassium nitrate ($KNO_3$).

3. The method for manufacturing a disk substrate of claim 1, wherein the plurality of filters comprise stainless steel filter media that is located outside of and spaced apart from said only one vessel and a furnace, such that the stainless steel filter media is not located in the furnace and said only one vessel is located in the furnace.

4. The method for manufacturing a disk substrate of claim 1, wherein said salt composition is periodically filtered after initial filtration.

5. The method for manufacturing a disk substrate of claim 1, wherein said salt composition is continuously filtered while performing said chemically strengthening step, after initial filtration.

6. The method for manufacturing a disk substrate of claim 1, wherein said salt composition is not further filtered after said initial filtration.

7. The method for manufacturing a disk substrate of claim 1, wherein said disk substrate is formed of a chemically strengthenable glass.

8. A method for chemically strengthening a disk substrate for a rotating disk drive data storage device, comprising the steps of:

filtering a molten salt composition with a parallel bank of a plurality of series of filters, each series of filters including filter media sizes of 2 microns or less and 0.5 microns or less, to remove impurities from said molten salt composition, thereby producing a filtered molten salt composition;

delivering the filtered molten salt composition to only one vessel;

chemically strengthening a disk substrate formed of a chemically strengthenable material by immersion in said filtered molten salt composition in the only one vessel; and wherein the plurality of series of filters is located outside of and spaced apart from said only one vessel and a furnace, such that the plurality of series of filters is not located in the furnace and said only one vessel is located in the furnace.

9. The method for chemically strengthening a disk substrate of claim 8, wherein said molten salt composition comprises a mixture of sodium nitrate ($NaNO_3$) and potassium nitrate ($KNO_3$), and the chemical strengthening step occurs in only one vessel for processing the disk substrate.

10. The method for chemically strengthening a disk substrate of claim 8, wherein said salt composition is periodically replaced with new salt composition, and wherein each new salt composition is initially filtered prior to use.

11. The method for chemically strengthening a disk substrate of claim 10, wherein said salt composition is periodically filtered after initial filtration.

12. The method for chemically strengthening a disk substrate of claim 10, wherein said salt composition is continuously filtered while performing said chemically strengthening step, after initial filtration.

13. The method for chemically strengthening a disk substrate of claim 10, wherein said salt composition is not further filtered after said initial filtration.

14. The method for chemically strengthening a disk substrate of claim 1, wherein said disk substrate is formed of a chemically strengthenable glass.

15. A method for manufacturing a disk substrate for a rotating disk drive data storage device, comprising the steps of:

forming a disk substrate of a chemically strengthenable glass to a desired shape and surface finish;

providing a furnace and a molten salt composition comprising a mixture of sodium nitrate ($NaNO_3$) and potassium nitrate ($KNO_3$);

filtering the molten salt composition through a parallel bank of a plurality of series of filters of stainless steel media filters that are spaced apart from and not located in the furnace, each series of filters including successive filter media sizes of 2 microns or less and 0.5 microns or less, to remove impurities from said molten salt composition, thereby producing a filtered molten salt composition;

delivering the filtered molten salt composition to only one vessel located in the furnace;

chemically strengthening the disk substrate by immersion in said filtered molten salt composition in the only one vessel, such that all of the chemical strengthening occurs in the only one vessel and the disk substrate is processed without movement to any other vessel; and periodically replacing the filtered molten salt composition in the only one vessel with new salt composition, and wherein each new salt composition is initially filtered prior to use.

16. The method for manufacturing a disk substrate of claim 15, wherein the salt composition is periodically filtered after initial filtration.

17. The method for manufacturing a disk substrate of claim 15, wherein the salt composition is continuously filtered while performing the chemically strengthening step, after initial filtration.

18. The method for manufacturing a disk substrate of claim 15, wherein the salt composition is not further filtered after said initial filtration.

* * * * *